(No Model.) 2 Sheets—Sheet 1.
A. DEININGER.
MALTING APPARATUS.
No. 567,124. Patented Sept. 8, 1896.
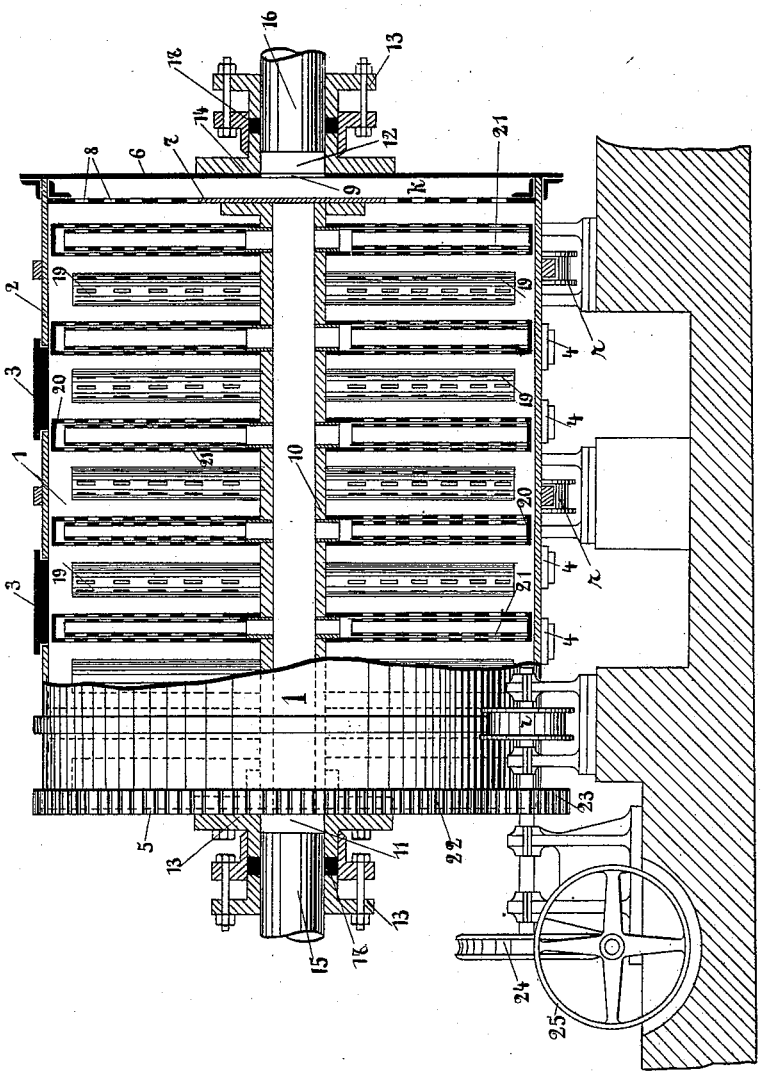
Witnesses:
Inventor:

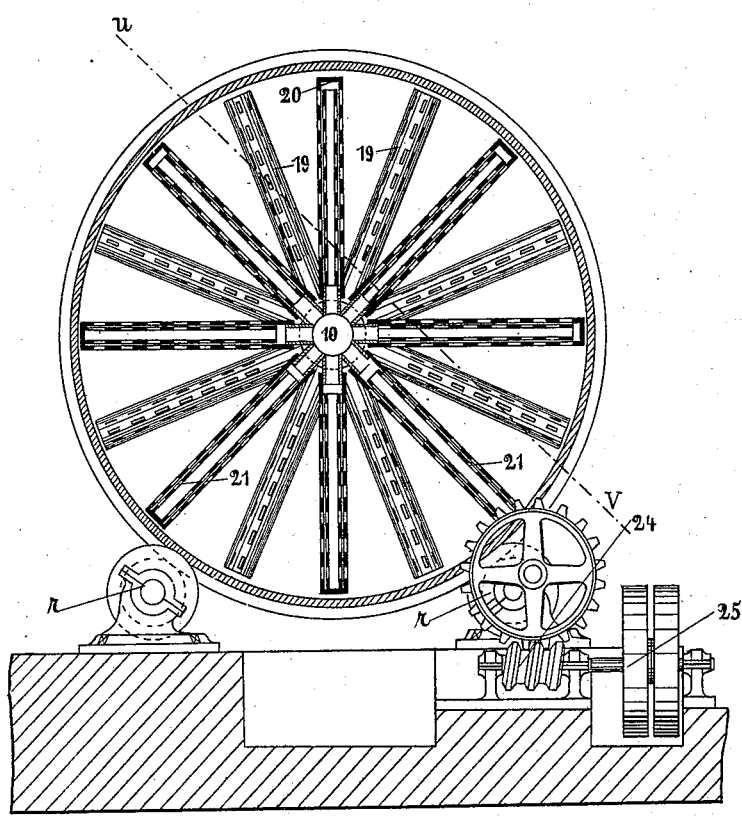

UNITED STATES PATENT OFFICE.

AUGUST DEININGER, OF BERLIN, GERMANY.

MALTING APPARATUS.

SPECIFICATION forming part of Letters Patent No. 567,124, dated September 8, 1896.

Application filed January 17, 1896. Serial No. 575,892. (No model.)

*To all whom it may concern:*

Be it known that I, AUGUST DEININGER, a subject of the Emperor of Germany, and a resident of Stephanstrasse 6, Berlin, in the Empire of Germany, have invented a certain new and useful Improved Malting Apparatus, of which the following is a specification.

This invention relates to a malting-drum having within it rotary radial arms, which also serve for air-feeds, in a manner hereinafter described.

The apparatus is shown in the annexed drawings, in which—

Figure I is a vertical longitudinal section of the drum. Fig. II is a vertical cross-section thereof.

The malt-drum 1 is composed of a cylindrical casing 2, in which are made openings 3 for the filling or emptying, with their closing-covers, as well as outlet-openings 4. The drum is closed at the ends by the heads 5 and 6. In the head 6 is a separating-wall 7, which is provided with sieve-like holes 8. The central part 9 of the separating-wall 7 is not perforated and is secured to the hollow axle 10. The assemblage of the hollow axle 10 with the head 5 is made detachable and permits of pulling out the separating-wall 7 with the hollow axle 10 after having taken off the attachment-screws and the head 6. The heads 5 and 6 have central openings 11 and 12. 11 serves to let in the air and 12 to let it out. Round these central openings 11 and 12 are fixed the two tubular sockets 13 and 14 upon the heads 5 and 6. Into these sockets 13 and 14 enter fixed tubes 15 and 16, around which the drum rotates and against which it is calked, by a stuffing-box and gland 18, provided with a packing 17.

On the hollow axle 10 are attached radial tubes 19, which communicate with the interior of the hollow axle 10. For this purpose the hollow axle 10 is provided with corresponding holes. The radial tubes are fixed upon the hollow axle 10 in such a manner as to be easily taken off. In the present case eight tubes are arranged in each plane, alternating with the next eight tubes, so that the second, fourth, sixth, &c., rows lie opposite the spaces between the first, third, fifth, &c., rows, as shown in Fig. II. The radial tubes 19 are closed at the end 20, but have in their walls sieve-like perforations through which the air can pass in. In the interior of these tubes 19 are arranged tubes 21, which are provided with the same distribution of holes as the tubes 19. The tubes 21 are guided in the tubes 19, so that they can slide in the direction of their axes but not turn. On the rotation of the drum the tubes 21, in consequence of their weight, take the positions shown in Fig. II. If required, the inner tubes 21 can also be moved by power in direction of their axes. By this arrangement the upper part of the interior of the drum is closed against the air passing through the hollow axle 10, while in the lower part of the drum communication remains open. The drum 1 must now be able to turn round the fixed tubes 15 and 16. For this purpose there is fixed upon the casing of the drum the toothed ring 22, which gears with the gear-wheel 23, turned by means of a worm and worm-wheel 24 by the pulley 25. It is advisable to take the weight of the drum on the rollers *r*.

The process is as follows: The drum 1 is filled at most to a third of its capacity with barley. Then water is poured in, and the swimming barley is taken out through the opening 3. Then the drum is closed and driven at a quick rate of revolution by a motor by means of the pulley 25. During this stage the washing-water is to be frequently changed, until all impurities are removed from the barley. The barley is then soaked, the water is run off, and the drum is set in quicker rotation until all water is removed. When this is done, the drum is brought to a standstill until the barley commences to sprout. After the appearance of the germ the ventilator is put in operation to force suitably-heated air into the drum, which is filled to about three-fourths of its capacity with the sprouted barley. During the revolution of the drum one set of the inner tubes 21 adopts, by their own weight or by corresponding forced shifting, such a position that they leave free the openings of the stationary radial tubes 19, covered completely with germinating barley, while the radial tubes which move in the empty space over the barley remain closed by the downsliding or by the correspondingly-arranged movement of the inner tubes 21, so that all the air which is introduced into the drum is forced to pass through the germinating barley before it leaves the drum.

By the particular arrangement of the radial tubes so that those of one group alternate with the next group the air-conducting tubes are so approached together that in these intervals between the groups of tubes a thin, not too heavy, layer of the germinating barley is formed, in which the air passes through all parts of the germinating material and is equally distributed.

The germinating action takes place with a temperature up to 15° centigrade, and the degree of damping of the air corresponds to this temperature, so that self-heating of the stuff is avoided.

After the germination is finished dry and cold air is driven into the drum, and after that hot air to kiln-dry the malt therein. After having finished the kiln-drying the malt is taken out of the drum, the wall 6 is taken off, and the separating-wall 7, with the groups of tubes, is pulled from the interior of the drum in order to clean all parts thoroughly, whereupon the same process may be recommenced.

I claim as my invention—

In a malting apparatus the combination of a rotary drum means for revolving the same, a hollow shaft 10 extending axially in said drum having one end closed, means for supplying air to the open end of said shaft, a series of perforated tubes arranged in alternating rows projecting from said hollow shaft within the drum, said tubes having their outer ends closed and their inner ends in free communication with the interior of said hollow shaft, a series of interior tubes adapted severally to slide in the aforesaid perforated tubes, and limiting-abutments at the inner and outer ends of the perforated tubes for limiting the sliding path of said inner tubes, the latter having perforations in such position that they are alined with the perforations in the outer tubes when in their outer position therein and are brought out of alinement when in their inward position substantially as and for the purpose set forth.

In witness whereof I have signed this specification in presence of two witnesses.

A. DEININGER.

Witnesses:
W. HAUPT,
CHAS. H. DAY.